(12) United States Patent
Gupta et al.

(10) Patent No.: US 10,873,512 B2
(45) Date of Patent: Dec. 22, 2020

(54) METHODS FOR MANAGING SELF-HEALING CLOUD INFRASTRUCTURE AND APPLICATIONS

(71) Applicant: VMware, Inc., Palo Alto, CA (US)

(72) Inventors: Vishal Gupta, Palo Alto, CA (US); Raj Yavatkar, Palo Alto, CA (US); Khoi Tran, Palo Alto, CA (US); Saar Noam, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 172 days.

(21) Appl. No.: 15/644,345

(22) Filed: Jul. 7, 2017

(65) Prior Publication Data

US 2019/0014023 A1 Jan. 10, 2019

(51) Int. Cl.
*H04L 12/26* (2006.01)
*G06F 11/30* (2006.01)
(Continued)

(52) U.S. Cl.
CPC .......... *H04L 43/08* (2013.01); *G06F 9/45533* (2013.01); *G06F 9/5072* (2013.01);
(Continued)

(58) Field of Classification Search
CPC ......... H04L 43/08; H04L 41/14; H04L 67/10; H04L 43/04; H04L 41/0893; H04L 41/5025; G06F 9/5077; G06F 9/45533; G06F 11/301; G06F 11/3006; G06F 11/3495; G06F 9/45558; G06F 11/0709; G06F 11/0712; G06F 11/0793; G06F 11/0751; G06F 11/079; G06F 2009/4557; G06F 11/3089; G06F 2009/45575; G06F 2009/45591; G06F 11/0706; G06F 11/076; G06F 11/0787; G06F 11/1438;
(Continued)

(56) References Cited

U.S. PATENT DOCUMENTS 8,364,802 B1 * 1/2013 Keagy ................. G06F 8/63
709/223
2010/0115315 A1 * 5/2010 Davis .................... G06F 1/3203
713/323

(Continued)

OTHER PUBLICATIONS

Ansible, "Ansible is Simple IT Automation," https://www.ansible.com, [Online], retrieved Apr. 29, 2019, 6 pages.
(Continued)

*Primary Examiner* — Benjamin R Bruckart
*Assistant Examiner* — Tien M Nguyen
(74) *Attorney, Agent, or Firm* — Hanley, Flight & Zimmerman, LLC (57) ABSTRACT

Methods, apparatus, systems and articles of manufacture are disclosed for managing cloud applications. An example apparatus includes a monitor to determine current states of virtual machines, a cloud manager to communicate with a hybrid cloud infrastructure, a healer to: compare the current states of the virtual machines to target states to determine a value of the difference, and in response to determining that the difference indicates that there are not enough healthy virtual machines to meet the target states, instructing the cloud manager to add virtual machines based on the value of the difference.

21 Claims, 5 Drawing Sheets

(51) Int. Cl.
G06F 9/455 (2018.01)
G06F 11/34 (2006.01)
H04L 29/08 (2006.01)
H04L 12/24 (2006.01)
G06F 9/50 (2006.01)

(52) U.S. Cl.
CPC ........ *G06F 11/301* (2013.01); *G06F 11/3006* (2013.01); *G06F 11/3055* (2013.01); *G06F 11/3495* (2013.01); *H04L 41/0659* (2013.01); *H04L 41/14* (2013.01); *H04L 43/0817* (2013.01); *H04L 67/10* (2013.01)

(58) Field of Classification Search
CPC ............. G06F 11/1482; G06F 11/2025; G06F 11/203; G06F 11/302; G06F 11/3409; G06F 2009/45562; G06F 2009/45579; G06F 2009/45587; G06F 9/4856; G06F 11/3466; G06F 2201/865; G06F 9/455; G06F 9/5083
See application file for complete search history.

(56) References Cited

U.S. PATENT DOCUMENTS

2017/0134237 A1* 5/2017 Yang .................. H04L 41/12
2018/0107522 A1* 4/2018 Wilson .................. G06F 9/505
2018/0267833 A1* 9/2018 Chen .................. G06F 9/505

OTHER PUBLICATIONS

Chef, "Chef: Deploy new code faster and more frequently," https://www.chef.io, [Online], retrieved Apr. 29, 2019, 7 pages.
Amazon Web Services, "AWS CloudFormation," https://aws.amazon.com/cloudformation, [Online], retrieved Apr. 29, 2019, 11 pages.
Cloud Foundry, "Cloud Foundry—Open Source Cloud Application Platform," https://www.cloudfoundry.org, [Online], retrieved Apr. 29, 2019, 8 pages.
Openstack Wiki, "Heat," https://wiki.openstack.org/wiki/Heat, [Online], retrieved Apr. 29, 2019, 5 pages.
OpenVPN, "VPN Software Solutions & Services for Business," https://openvpn.net, [Online], retrieved Apr. 29, 2019, 4 pages.
Puppet, "Deliver better software, faster," https://puppet.com, [Online], retrieved Apr. 29, 2019, 13 pages.
Amazon Web Services, "AWS Auto Scaling," https://aws.amazon.com/autoscaling, [Online], retrieved Apr. 29, 2019, 7 pages.
Amazon Web Services, "Hybrid Cloud Architectures," https://aws.amazon.com/enterprise/hybrid, [Online], retrieved Apr. 29, 2019, 9 pages.
Amazon Web Services, "VMware Cloud on AWS," https://aws.amazon.com/vmware, [Online], retrieved Apr. 29, 2019, 14 pages.
Amazon Web Services, "Amazon Virtual Private Cloud (VPC)," https://aws.amazon.com/vpc, [Online], retrieved Apr. 29, 2019, 7 pages.
CloudSuite, "CloudSuite: A benchmark suite for cloud services," https://cloudsuite.ch/benchmarks, [Online link invalid], https://web.archive.org/web/20161129091902/http://cloudsuite.ch/benchmarks/, retrieved Apr. 29, 2019, 1 page.
GitHub, "GitHub—docker/infrakit: A toolkit for creating and managing declarative, self-healing infrastructure," https://github.com/docker/infrakit, [Online], retrieved Apr. 29, 2019, 8 pages.
Docker, "Container Orchestration—Run Swarm & Kubernetes Interchangeably," https://www.docker.com/products/docker-swarm, [Online], retrieved Apr. 29, 2019, 7 pages.
Google Cloud, "Instance Groups," https://cloud.google.com/compute/docs/instance-groups, [Online], retrieved Apr. 29, 2019, 6 pages.
The Kubernetes Authors, "Production-Grade Container Orchestration," https://kubernetes.io, [Online], retrieved Apr. 29, 2019, 4 pages.
Kubernetes, "Federating Clusters," https://kubernetes.io/docs/admin/federation, [Online link invalid], https://web.archive.org/web/20161208151615/http://kubernetes.io/docs/admin/federation/, retrieved Apr. 29, 2019, 6 pages.
Guo et al., "Seagull: Intelligent cloud Bursting for Enterprise Applications," In Proceedings of the 2012 USENIX Conference on Annual Technical Conference, ATC'12, USENIX Association, 2012, 8 pages.
Hashicorp, "Terraform," https://terraform.io, [Online], retrieved Apr. 29, 2019, 7 pages.
IBM, "IBM Cloud for VMware Solutions," https://softlayer.com/vmware-solutions, [Online link invalid], https://web.archive.org/web/20180816071640/https://www.ibm.com/cloud/vmware, retrieved Apr. 29, 2019, 8 pages.
Microsoft Azure, "Azure Virtual Machine Scale Sets," https://azure.microsoft.com/en-us/services/virtual-machine-scale-sets, [Online], retrieved Apr. 29, 2019, 6 pages.
Pivotal, "Cloud-Native Applications: Ship Faster, Reduce Risk, Grow Your Business," https://pivotal.io/cloud-native, [Online], retrieved Apr. 29, 2019, 7 pages.
Unuvar, "C-Ports: Docker Containers Across Multiple Clouds and Datacenters!" IBM Cloud, https://www.ibm.com/blogs/bluemix/2015/08/c-ports-docker-containers-across-multiple-clouds-datacenters, [Online], published Aug. 26, 2015, 10 pages.
VMware, "Admiral: Highly Scalable Container Management Platform," https://vmware.github.io/admiral, [Online], retrieved Apr. 29, 2019, 2 pages.
VMware, "High Availability—vSphere," https://www.vmware.com/products/vsphere/high-availability.html, [Online], retrieved Apr. 29, 2019, 4 pages.
VMware, "Photon Controller," https://vmware.github.io/photon-controller, [Online], retrieved Apr. 29, 2019, 2 pages.
VMware, "VMware Cloud Foundation," https://www.vmware.com/products/cloud-foundation.html, [Online], retrieved Apr. 29, 2019, 2 pages.
VMware, "vSphere Integrated Containers Engine," https://vmware.github.io/vic, [Online], retrieved Apr. 29, 2019, 2 pages.
VMware, "Spotlight Sessions—VMworld US," https://www.vmworld.com/en/sessions/spotlights-us.html, [Online], retrieved Apr. 29, 2019, 17 pages.
VMware, "vRealize Automation," https://www.vmware.com/products/vrealize-automation.html, [Online], retrieved Apr. 29, 2019, 2 pages.

* cited by examiner

METHODS FOR MANAGING SELF-HEALING CLOUD INFRASTRUCTURE AND APPLICATIONS

FIELD OF THE DISCLOSURE

This disclosure relates generally to virtualized computing, and, more particularly, to methods and apparatus for managing cloud applications.

BACKGROUND

Enterprises are increasingly embracing modern cloud-native applications and public clouds for simplifying the operation of their services. The cloud-native computing paradigm radically simplifies building as well as running applications in a cloud environment. Based on a micro-service architecture and making use of container technology, cloud-native applications make it extremely easy to develop, deploy, and run services. Cloud-native architectures add agility to the application lifecycle, which allows developers to focus on rapidly delivering value.

DETAILED DESCRIPTION

Managing cloud infrastructures for cloud-native applications still remains a challenge for organizations (e.g., provisioning, capacity planning, handling failures, etc.). Compounding the complexity of infrastructure management in the cloud landscape is another trend shaping modern enterprises: hybrid cloud computing (e.g., using a combination of on premise private cloud(s) and off-premise public cloud(s). Hybrid cloud allows organizations to gain the advantages of both private and public clouds (e.g., combining the control and reliability of private cloud with the flexibility and cost efficiency of public clouds). While hybrid cloud presents new opportunities to satisfy the dynamic needs of organizations, it also increases the complexity of managing infrastructure deployed across multiple cloud types.

Example methods and apparatus disclosed herein facilitate self-healing of cross-cloud infrastructure. Such self-healing facilitates, for example, running containerized applications in a hybrid cloud environment.

Figure 1:
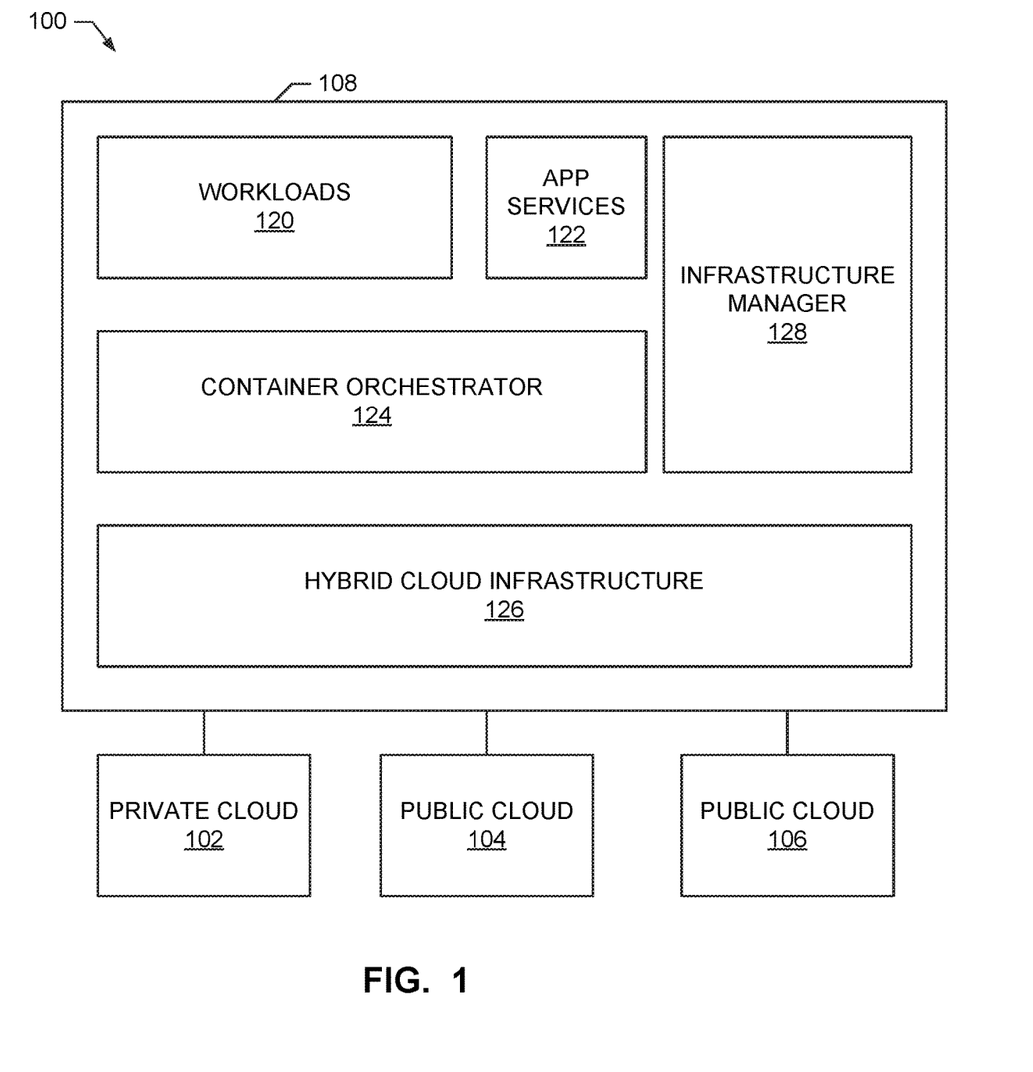
FIG. 1 is a block diagram of an example environment including an example private cloud, an example first public cloud, and an example second public cloud.

FIG. 1 is a block diagram of an example environment 100 including an example private cloud 102, an example first public cloud 104, and an example second public cloud 106. The example environment 100 further includes an example infrastructure coupled to the example private cloud 102, the example first public cloud 104, and the example second public cloud 106.

The example clouds 102-106 provide computing resources that may be utilized by the infrastructure to execute virtual machines. The example clouds 102-106 include networks coupling multiple computing resources to implement a cloud. The private cloud 102 of the illustrated example is a cloud computing platform that is available only to the entity managing the example infrastructure 108. For example, the example private cloud 102 may be a deployment of a VMware® cloud by an organization. The example private cloud 102 may be hosted by the entity managing the example infrastructure 108 or may be hosted by another entity that provides exclusive access to the entity. The example first public cloud 104 and the example second public cloud 106 are hosted by entities different than the entity managing the example infrastructure 108. For example, the public clouds 104-106 may be clouds implemented by Amazon®, Google®, Microsoft®, etc. While the illustrated example environment 100 includes one private cloud 102 and two public clouds 104-106, any number and combination of clouds may be utilized with the infrastructure 108.

The example infrastructure 108 operates virtual machines on the example clouds 102-106 to execute containerized applications for tenants. The example infrastructure 108 includes example workloads 120, an example application services 122, an example container orchestrator 124, an example hybrid cloud infrastructure 126, and an example infrastructure manager 128.

The example workloads 120 are work items that a tenant has requested to be performed/processed by the example infrastructure 108. For example, a workload may be processing some data, processing a credit card transaction, serving a webpage, accessing data in a database, etc.

The example application services 122 provides tools for creating and deploying applications. For example, the example application services 122 allows for the deployment of applications based on blueprint templates. The example application services 122 additionally provides tools for automating the creation, management, and retirement of applications.

The example container orchestrator 124 configures the workloads 120 to be executed as containerized application(s) for execution by the example hybrid cloud infrastructure. The example hybrid cloud infrastructure includes a plurality of virtual machines executing within the clouds 102-106. Where multiple tenants may access the example infrastructure 108, the example hybrid cloud infrastructure 126 may provide isolation by limiting the execution of a tenant's applications to virtual machine's of the tenant.

The example infrastructure manager 128 monitors and controls the operation of the infrastructure 108 to provide for self-healing to efficiently ensure the health of the infrastructure 108 in performing the example workloads 120. The example infrastructure manager 128 organizes resources into groups called cliques herein. A clique is a set of nodes (e.g., hosts, virtual machines, etc.) with matching (e.g., identical, similar, etc.) deployment and/or configuration specifications. In some examples, the deployment and/or configuration specifications can be described using a declarative syntax. Clique abstraction allows for management of infrastructure for various scenarios by implementing corresponding node management drivers. The example infrastructure manager 128 monitors the operation of virtual machines assigned to a clique to compare the state of the health of the clique to a target state and take action if the current state does not match the target state. In some examples, a clique definition includes a spec (which includes two parts: deployment spec and configuration spec used to deploy and configure a node respectively) and desired clique size (number of nodes). For example, an environment may include multiple cliques spanning multiple clouds (e.g., a first clique including a number of Master nodes, a second clique including a number of small Worker nodes, and a third clique including a number of large Worker nodes).

Figure 2:
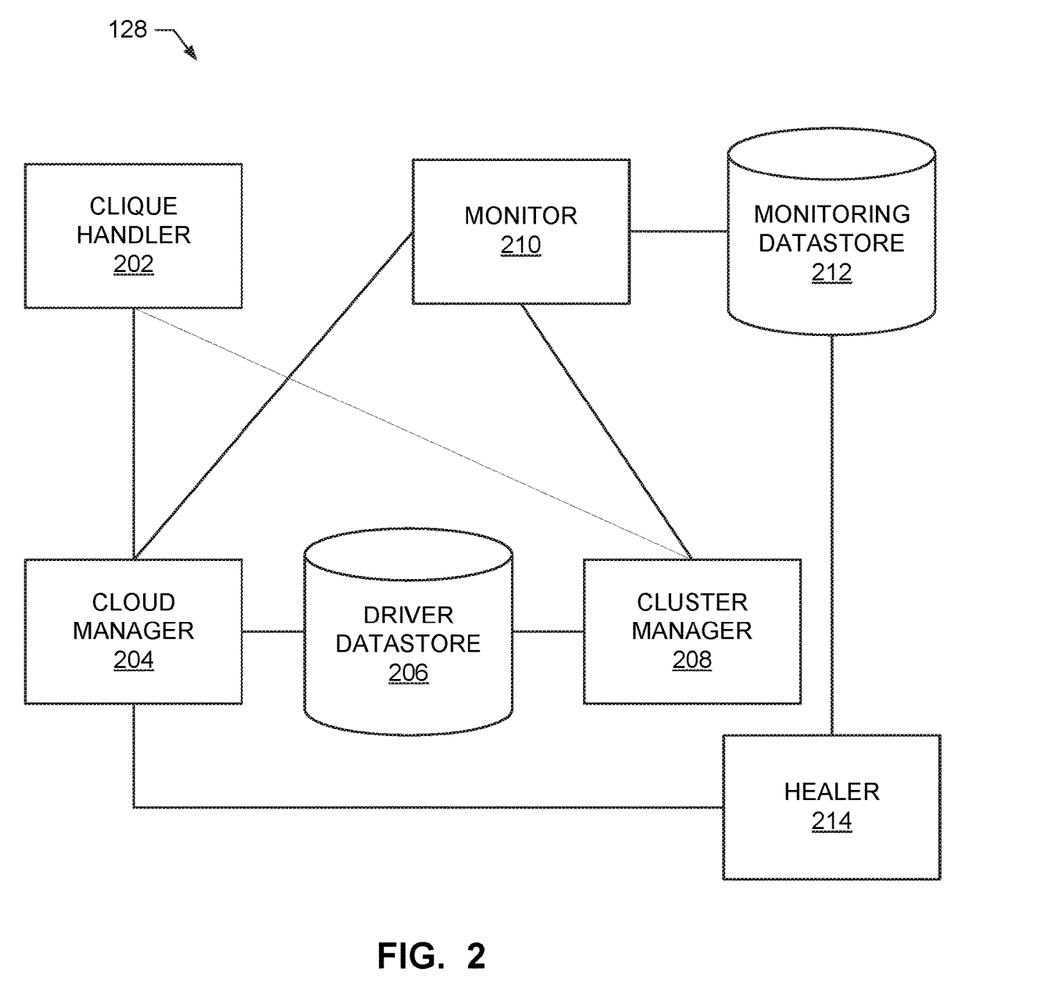
FIG. 2 is a block diagram of an example implementation of the infrastructure manager of FIG. 1.

FIG. 2 is a block diagram of an example implementation of the infrastructure manager 128 of FIG. 1. The example infrastructure manager 128 of FIG. 2 includes an example clique handler 202, an example cloud manager 204, an example driver datastore 206, an example cluster manager 208, an example monitor 210, an example monitoring datastore 214, and an example healer 214.

The example clique handler 202 generates a clique based on parameters received from a tenant. For example, the parameters may provide a deployment specification, a configuration specification, a size, etc. The deployment specification may identify a cloud type (e.g., private, public, a particular cloud provider, etc.) and a machine type (e.g., small, large, etc.). The configuration specification may identify a cluster type (e.g., identify a particular clustering engine) and a role type for a node (e.g., master, worker, etc.). The example clique handler 202 adds, retrieves, and deletes nodes from an example clique via the example cloud manager 204.

The cloud manager 204 of the illustrated example provides an interface for the example infrastructure manager 128 to perform operations on the virtual machines of the hybrid cloud infrastructure 126 executing on the example clouds 102-106. According to the illustrated example, the cloud manager 204 accesses drivers for a specific cloud type to be managed. The example cloud manager 204 retrieves relevant drivers from the example driver datastore 206.

The example driver datastore 206 stores drivers for accessing the unique clouds 102-106. For example, the drivers may provide unified access to the various clouds 102-106 to enable common operations to be performed on clouds 102-106 that may be implemented in unique manners, expect unique interface characteristics, etc. The example driver datastore 206 is a database. Alternatively, the example driver datastore 206 may be implemented by any type of data storage (e.g., files, memory, etc.).

The example cluster manager 208 facilitates access to containers (or other type of cluster) frameworks via cluster-specific drivers retrieved from the example driver datastore 206. For example, the cluster manager 208 retrieves node health, configures nodes, etc.

The example monitor 210 accesses cloud node information via the example cloud manager 204 and accesses cluster information via the example cluster manager 208 to monitor the health of the nodes in a clique. The example monitor 210 stores the collected monitoring information in the example monitoring datastore 212.

The example monitoring datastore 212 is a database for storing monitoring information collected by the example monitor 210. Alternatively, the example monitoring datastore 212 may be implemented by any type of data storage (e.g., files, memory, etc.).

The example healer 214 retrieves and analyzes monitoring information retrieved from the example monitoring datastore 212 to determine the health of the infrastructure and to, when needed, perform operations via the example cloud manager 204 to correct unhealthy conditions in the example infrastructure. According to the illustrated example, the monitoring information identifies virtual machines and their states. The example healer 214 compares the monitoring information with target information and identifies any discrepancies. The example healer 214 either instructs the cloud manager to add nodes or remove nodes to return the infrastructure to the target state.

While an example manner of implementing the infrastructure manager 128 of FIG. 1 is illustrated in FIG. 2, one or more of the elements, processes and/or devices illustrated in FIG. 2 may be combined, divided, re-arranged, omitted, eliminated and/or implemented in any other way. Further, the example clique handler 202, the example cloud manager 204, the example cluster manager 208, the example monitor 210, the example healer 214 and/or, more generally, the example infrastructure manager 128 of FIG. 1 may be implemented by hardware, software, firmware and/or any combination of hardware, software and/or firmware. Thus, for example, any of the example clique handler 202, the example cloud manager 204, the example cluster manager 208, the example monitor 210, the example healer 214 and/or, more generally, the example infrastructure manager 128 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example clique handler 202, the example cloud manager 204, the example cluster manager 208, the example monitor 210, the example healer 214 and/or, more generally, the example infrastructure manager 128 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example infrastructure manager 128 of FIG. 1 may include one or more elements, processes and/or devices in addition to, or instead of, those illustrated in FIG. 2, and/or may include more than one of any or all of the illustrated elements, processes and devices.

Figure 3:
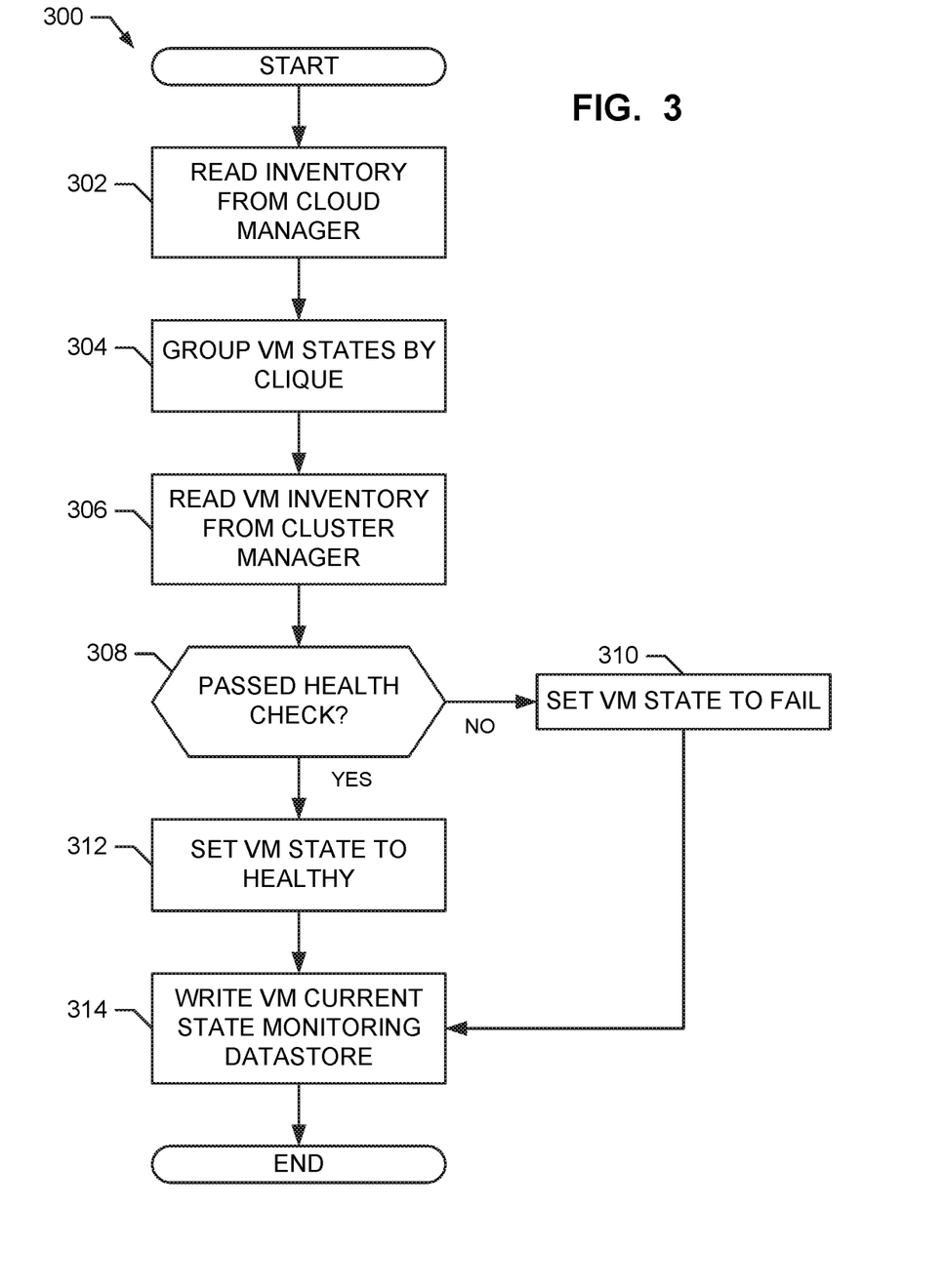
FIGS. 3-4 illustrate flowcharts representative of machine readable instructions that may be executed to implement the example infrastructure manager of FIGS. 1 and/or 2.
Figure 4:
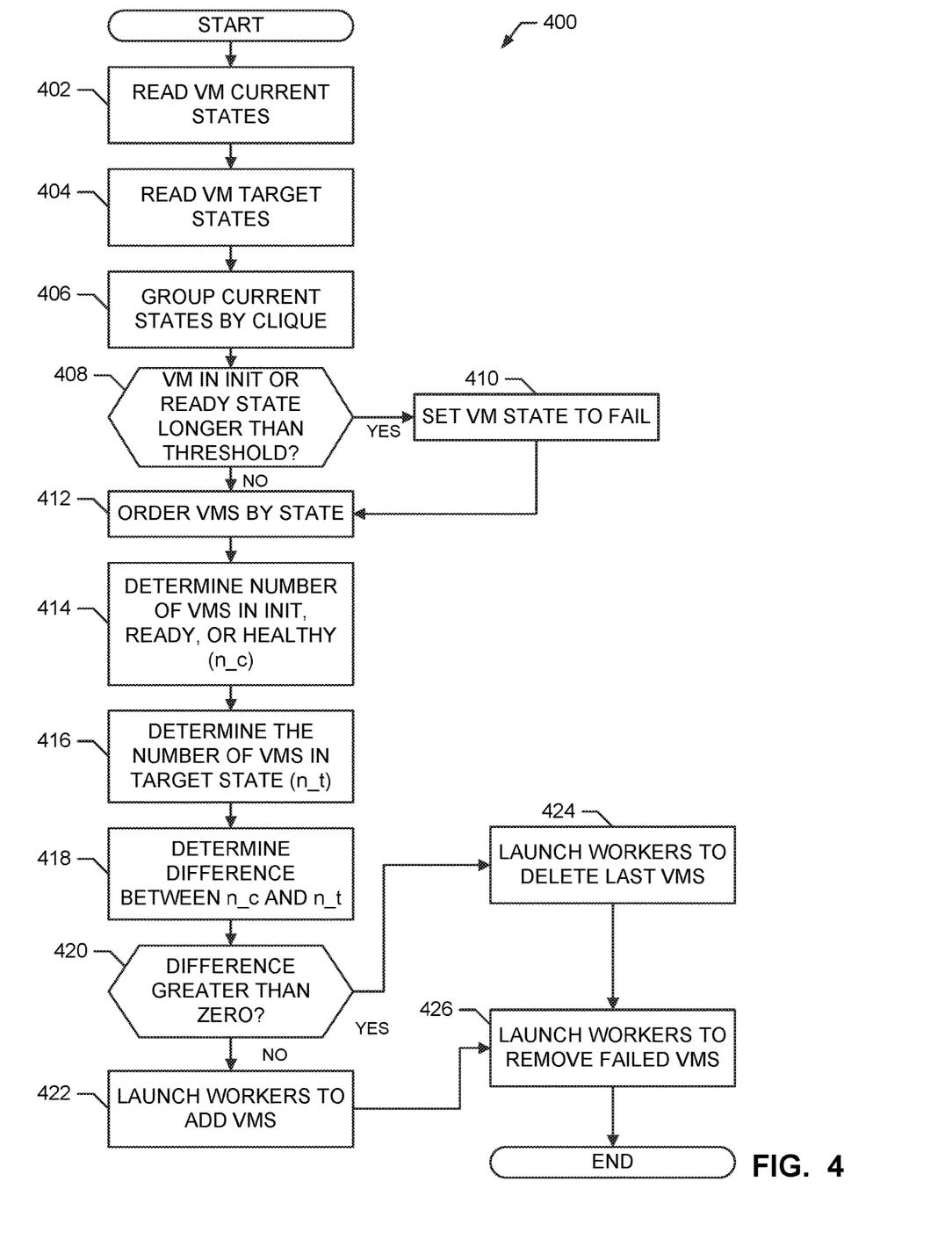

Flowcharts representative of example machine readable instructions for implementing the infrastructure manager 128 of FIGS. 1 and/or 2 are shown in FIGS. 3-4. In this example, the machine readable instructions comprise a program for execution by a processor such as the processor 512 shown in the example processor platform 500 discussed below in connection with FIG. 5. The program may be embodied in software stored on a non-transitory computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIGS. 3-4, many other methods of implementing the example infrastructure manager 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program 300 of FIG. 3 begins at block 302 when the example cloud manager 204 retrieves a virtual machine inventory that includes states of the virtual machines. For example, a new virtual machine may initially be put into an "init" state and moved to a "ready" state after a successful configuration. The example clique handler 202 groups the retrieved virtual machines by clique (e.g., groups all virtual machines associated with the same clique identifier) (block 304). The example monitor 210 then invokes a health check by retrieving a virtual machine inventory for the cluster from the example cluster manager 208 (block 306). The example monitor 210 determines if each virtual machine passed the health check (block 308). For example, a virtual machine in the inventory from the cloud manager 204 may pass a health check if the virtual machine is also present in the inventory from the example cluster manager 208 (e.g., evidencing that the virtual machine is running and also successfully connected to the container cluster). Alternatively, any other type of health check applicable to the nodes may be performed. According to the illustrated example, the health check procedures, instructions, etc. for a clique are included in the definition of the clique. For example, a health check may include analyzing memory of a physical computing machine, verifying that a software application is running, verifying an active state of a virtual machine, etc. Accordingly, custom health checks applicable to the nodes of a clique may be applied based on the clique definition.

For each virtual machine that does not pass the health check (block 308), the example monitor 210 sets the corresponding virtual machine to the "fail" state (block 310). For each virtual machine that passes the health check (block 308), the example monitor 210 sets the corresponding virtual machine to the "healthy" state (block 312). The example monitor 210 stores the virtual machine states to the example monitoring datastore 212 (block 314).

The monitoring process 300 of FIG. 3 then ends.

The process 400 of FIG. 4 begins when the example healer 214 reads the current state of virtual machines from the example monitoring datastore 212 (block 402). The example healer 214 reads the target states for virtual machines from the example monitoring datastore 212 (block 404). For example, the target states may be identified by a tenant when establishing access to the example infrastructure 108 of FIG. 1.

The example healer 214 groups the virtual machine current states by clique (block 406). The example healer 214 determines if each virtual machine for a clique has been in the "init" or "ready" state for longer than a threshold (e.g., the state has not moved to "healthy" in a threshold amount of time) (block 408). For each virtual machine that has been in the "init" or "ready" state longer than the threshold, the example healer 214 sets the state of the virtual machine to "fail" (block 410). For example, the healer 214 may stores the "fail" state in the example monitoring datastore 212.

The example healer 214 orders the identified virtual machines by state (block 412). Putting the virtual machines in order by state allows identification of virtual machines that are the least healthy (e.g., "fail," "init," "ready," etc.

The example healer 214 then determines the number (n_c) of virtual machines that are operational (e.g., in the "init," "ready," or "healthy" state) (block 414). The example healer 214 then determines the number (n_t) of virtual machines called for in the target states (block 416). The example healer 214 then determines a difference between the operational virtual machines and the target virtual machines (e.g., n_d=n_c−n_t) (block 418). The example healer 214 determines if the difference is greater than zero (block 420).

When the difference (n_d) is greater than zero (420), the healer 214 instructs the example cloud manager 204 to launch workers to delete the n_d least ranking (e.g., the least operational) virtual machines (block 422).

When the difference (n_d) is less than zero (420), the healer 214 instructs the example cloud manager 204 to launch workers to add n_d virtual machines (block 424). For example, to add a virtual machine, a worker may set a virtual machine to the "init" state, invoke a cloud and/or cluster manager to deploy and/or configure the virtual machine into the cloud and/or cluster, and, once successful, set the virtual machine to the "ready" state.

After deleting (block 422) or adding (block 424) virtual machines, the example healer 214 instructs the example cloud manager 204 to launch workers to remove any failed virtual machines indemnified in block 410 (block 426). For example, to delete the virtual machine, a worker may set the virtual machine to the "delete" state and then invoke a cloud and/or cluster manager to delete the virtual machine from the cloud and/or cluster.

The process of FIG. 4 then ends.

Figure 5:
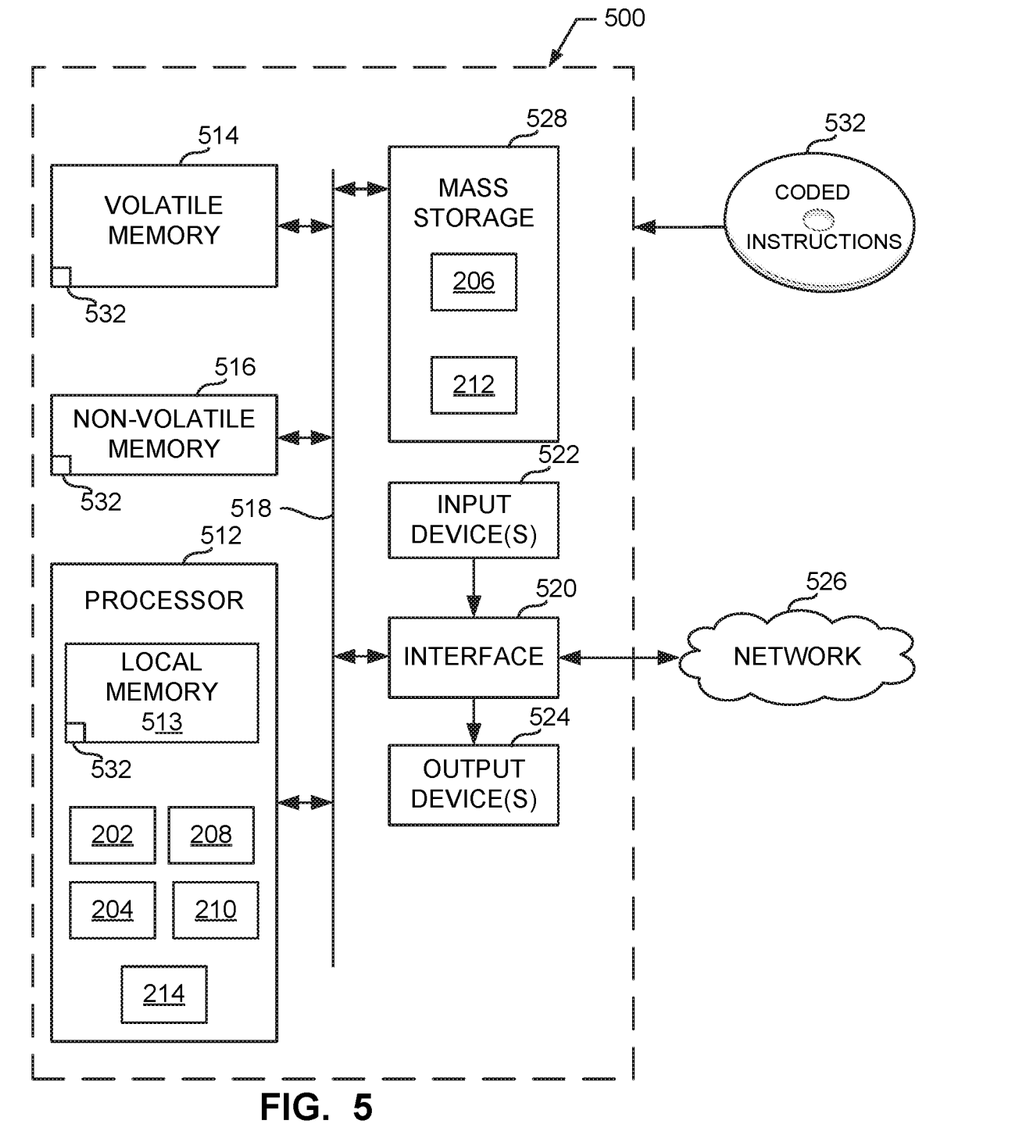
FIG. 5 is a block diagram of an example processor system that may execute the instructions of FIGS. 3-4 to implement the example infrastructure manager of FIG. 1.

FIG. 5 is a block diagram of an example processor platform 500 capable of executing the instructions of FIGS. 3-4 to implement the infrastructure manager 128 of FIG. 1 and/or FIG. 2. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. The hardware processor may be a semiconductor based (e.g., silicon based) device. In this example, the processor implements the example clique handler 202, the example cloud manager 204, the example cluster manager 208, the example monitor 210 and the example healer 214.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIGS. 3-4 may be stored in the mass storage device 528, in the volatile memory 514, in the non-volatile memory 516, and/or on a removable tangible computer readable storage medium such as a CD or DVD.

From the foregoing, it will be appreciated that example methods, apparatus and articles of manufacture have been disclosed that facilitate the management of a cloud infrastructure. In some examples, improvements to the operation of the computerized cloud environment are realized due to the management of operating the appropriate number of virtual machines (not operating too many virtual machines or operating too few virtual machines).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage cloud applications, the apparatus comprising:
    a monitor to determine current states of virtual machines;
    a cloud manager to communicate with a hybrid cloud infrastructure; and
    a healer to:
        determine if a virtual machine has been in an operational state of "init" or "ready" state for longer than a threshold amount of time;
        in response to determining that the virtual machine has been in the "init" or "ready" state for longer than the threshold amount of time, set the virtual machine to a "fail" state;
        compare the current states of the virtual machines to target states to determine a difference between the number of operational virtual machines and the number of target virtual machines requested in the target states;
        in response to determining that the difference indicates that there are not enough healthy virtual machines satisfying a health check to meet the target states, instruct the cloud manager to add virtual machines based on the difference; and
        in response to determining that the difference indicates that there are more healthy virtual machines than the number of target virtual machines requested in the target states, instruct the cloud manager to remove an additional virtual machine based on the difference and a health-based ranking of operational virtual machines.

2. An apparatus as defined in claim 1, further including a driver datastore to store a first driver for accessing a first type of virtual computing cloud and a second driver to accessing a second type of virtual computing cloud.

3. An apparatus as defined in claim 2, wherein the driver datastore is further to store a third driver for accessing a type of cluster environment.

4. An apparatus as defined in claim 1, further including the cluster manager to transmit a virtual machine inventory for a cluster to the monitor.

5. An apparatus as defined in claim 4, wherein the cloud manager is to determine an inventory of virtual machines in a cloud.

6. An apparatus as defined in claim 5, wherein the monitor is to determine if a virtual machine included in the virtual machine inventory passes the health check.

7. An apparatus as defined in claim 6, wherein the monitor is to determine if a virtual machine included in the inventory of virtual machines in the cloud passes the health check based on whether the virtual machine is included in the inventory of virtual machines in the cluster.

8. A method to manage cloud applications, the method comprising:
    determining current states of virtual machines;
    determining if a virtual machine has been in an operational state of "init" or "ready" state for longer than a threshold amount of time;
    in response to determining that the virtual machine has been in the "init" or "ready" state for longer than the threshold amount of time, setting the virtual machine to a "fail" state;
    comparing the current states of the virtual machines to target states to determine a difference between the number of operational virtual machines and the number of target virtual machines requested in the target states in response to determining that the difference indicates that there are not enough healthy virtual machines satisfying a health check to meet the target states, adding virtual machines based on the difference; and in response to determining that the difference indicates that more healthy virtual machines are active than the number of target virtual machines requested in the target states, instruct the cloud manager to remove an additional virtual machine based on the difference and a health-based ranking of operational virtual machines.

9. A method as defined in claim 8, storing a first driver for accessing a first type of virtual computing cloud and a second driver to accessing a second type of virtual computing cloud.

10. A method as defined in claim 9, further including storing a third driver for accessing a type of cluster environment.

11. A method as defined in claim 8, further including transmitting a virtual machine inventory for a cluster to a monitor.

12. A method as defined in claim 11, further including determining an inventory of virtual machines in a cloud.

13. A method as defined in claim 12, further including determining if a virtual machine included in the virtual machine inventory passes the health check.

14. A method as defined in claim 13, further including determining if a virtual machine included in the inventory of virtual machines in the cloud passes the health check based on whether the virtual machine is included in the inventory of virtual machines in the cluster.

15. A non-transitory computer readable storage medium comprising instructions that, when executed, cause a machine to at least:
    determine current states of virtual machines;
    communicate with a hybrid cloud infrastructure;
    determine if a virtual machine has been in an operational state of "init" or "ready" state for longer than a threshold amount of time;
    in response to determining that the virtual machine has been in the "init" or "ready" state for longer than the threshold amount of time, set the virtual machine to a "fail" state;
    compare the current states of the virtual machines to target states to determine a difference between the number of operational virtual machines and the number of target virtual machines requested in the target states; and
    in response to determining that the difference indicates that there are not enough healthy virtual machines to meet the target states, add virtual machines based on the difference; and
    in response to determining that the difference indicates that there are more healthy virtual machines than the number of target virtual machines requested in the target states, instruct the cloud manager to remove an additional virtual machine based on the difference and a health-based ranking of operational virtual machines.

16. A non-transitory computer readable storage medium as defined in claim 15, wherein the instructions, when executed, cause the machine to store a first driver for accessing a first type of virtual computing cloud and a second driver to accessing a second type of virtual computing cloud.

17. A non-transitory computer readable storage medium as defined in claim 16, wherein the instructions, when executed, cause the machine to store a third driver for accessing a type of cluster environment.

18. A non-transitory computer readable storage medium as defined in claim 15, wherein the instructions, when executed, cause the machine to transmit a virtual machine inventory for a cluster to a monitor.

19. A non-transitory computer readable storage medium as defined in claim 18, wherein the instructions, when executed, cause the machine to determine an inventory of virtual machines in a cloud.

20. A non-transitory computer readable storage medium as defined in claim 19, wherein the instructions, when executed, cause the machine to determine if a virtual machine included in the virtual machine inventory passes the health check.

21. A non-transitory computer readable storage medium as defined in claim 20, wherein the instructions, when executed, cause the machine to determine if a virtual machine included in the inventory of virtual machines in the cloud passes the health check based on whether the virtual machine is included in the inventory of virtual machines in the cluster.

* * * * *